(12) United States Patent
Champ

(10) Patent No.: US 8,099,877 B2
(45) Date of Patent: Jan. 24, 2012

(54) ENHANCED POSITION DETECTION FOR A CMM

(75) Inventor: Peter Champ, Pinner (GB)

(73) Assignee: Hexagon Metrology AB, Nacka Strand (SE)

(*) Notice: Subject to any disclaimer, the term of this patent is extended or adjusted under 35 U.S.C. 154(b) by 0 days.

(21) Appl. No.: 12/748,267

(22) Filed: Mar. 26, 2010

(65) Prior Publication Data

US 2011/0107614 A1    May 12, 2011

Related U.S. Application Data

(60) Provisional application No. 61/259,105, filed on Nov. 6, 2009.

(51) Int. Cl.
*G01B 5/008* (2006.01)
*G01B 7/008* (2006.01)

(52) U.S. Cl. .......................................................... 33/503

(58) Field of Classification Search ............... 33/503
See application file for complete search history.

(56) References Cited

U.S. PATENT DOCUMENTS

| | | | |
|---|---|---|---|
| 4,561,776 A | 12/1985 | Pryor | |
| 4,592,697 A | 6/1986 | Tuda et al. | |
| 4,679,331 A * | 7/1987 | Koontz | 33/551 |
| 4,838,696 A | 6/1989 | Pryor | |
| 4,888,877 A * | 12/1989 | Enderle et al. | 33/559 |
| 4,903,539 A * | 2/1990 | Toyoda et al. | 74/490.01 |
| 4,972,090 A | 11/1990 | Eaton | |
| 5,006,721 A | 4/1991 | Cameron et al. | |
| 5,008,555 A | 4/1991 | Mundy | |
| 5,084,981 A | 2/1992 | McMurtry et al. | |
| 5,088,337 A | 2/1992 | Bennett | |
| 5,129,044 A | 7/1992 | Kashiwagi | |
| 5,148,377 A | 9/1992 | McDonald | |
| 5,187,874 A | 2/1993 | Takahashi et al. | |
| 5,189,797 A | 3/1993 | Granger | |
| 5,251,127 A | 10/1993 | Raab | |
| 5,305,203 A | 4/1994 | Raab | |
| 5,332,895 A | 7/1994 | Rieder | |
| 5,396,712 A | 3/1995 | Herzog | |

(Continued)

FOREIGN PATENT DOCUMENTS

DE    3204885    2/1983

(Continued)

OTHER PUBLICATIONS

European Patent Office, International Search Report and Written Opinion, Sep. 22, 2011, Issue PCT/US2010/055713.

(Continued)

*Primary Examiner* — Christopher Fulton
(74) *Attorney, Agent, or Firm* — Knobbe, Martens, Olson & Bear, LLP

(57) ABSTRACT

A coordinate measurement device comprises an articulated arm and a laser scanner assembly. The articulated arm can have a first end, a second end, and a plurality of jointed arm segments therebetween. Each arm segment can define at least one axis of rotation, and a last axis of rotation can be defined by bearings near a distal end of the arm. The laser scanner assembly can couple to the distal end of the arm. The arm can continuously generate trigger signals that are received by the laser scanner and indicate a time at which the arm's position is measured.

16 Claims, 16 Drawing Sheets

U.S. PATENT DOCUMENTS

| | | |
|---|---|---|
| 5,402,582 A | 4/1995 | Raab |
| 5,408,754 A | 4/1995 | Raab |
| 5,412,880 A | 5/1995 | Raab |
| 5,424,835 A | 6/1995 | Cosnard et al. |
| 5,505,003 A | 4/1996 | Evans et al. |
| 5,510,977 A | 4/1996 | Raab |
| 5,521,847 A | 5/1996 | Ostrowski et al. |
| 5,526,576 A | 6/1996 | Fuchs et al. |
| 5,528,505 A | 6/1996 | Granger et al. |
| 5,530,549 A | 6/1996 | Brown |
| 5,611,147 A | 3/1997 | Raab |
| 5,615,489 A | 4/1997 | Breyer et al. |
| 5,748,767 A | 5/1998 | Raab |
| 5,757,499 A | 5/1998 | Eaton |
| 5,768,792 A | 6/1998 | Raab |
| 5,794,356 A | 8/1998 | Raab |
| 5,822,450 A | 10/1998 | Arakawa et al. |
| 5,829,148 A | 11/1998 | Eaton |
| 5,917,181 A | 6/1999 | Yoshizumi et al. |
| 5,926,782 A | 7/1999 | Raab |
| 5,956,857 A | 9/1999 | Raab |
| 5,957,837 A | 9/1999 | Raab |
| 5,978,748 A | 11/1999 | Raab |
| 5,991,704 A | 11/1999 | Rekar et al. |
| 6,012,332 A | 1/2000 | Schafer |
| 6,015,473 A | 1/2000 | Rosenberg |
| 6,029,522 A | 2/2000 | Schafer |
| 6,078,846 A | 6/2000 | Greer et al. |
| 6,092,418 A | 7/2000 | Schafer |
| 6,092,419 A | 7/2000 | Dixon |
| 6,128,081 A | 10/2000 | White |
| 6,131,299 A | 10/2000 | Raab et al. |
| 6,134,506 A | 10/2000 | Rosenberg et al. |
| 6,151,789 A | 11/2000 | Raab |
| 6,161,079 A | 12/2000 | Zink et al. |
| 6,166,811 A | 12/2000 | Long et al. |
| 6,180,939 B1 | 1/2001 | Markey, Jr. et al. |
| 6,219,928 B1 | 4/2001 | Raab et al. |
| 6,253,458 B1 | 7/2001 | Raab et al. |
| 6,256,038 B1 | 7/2001 | Krishnamurthy |
| 6,256,039 B1 | 7/2001 | Krishnamurthy |
| 6,271,856 B1 | 8/2001 | Krishnamurthy |
| 6,276,209 B1 | 8/2001 | Schafer |
| 6,279,246 B1 | 8/2001 | van den Bossche |
| 6,295,907 B1 | 10/2001 | Schafer |
| 6,298,569 B1 | 10/2001 | Raab et al. |
| 6,366,831 B1 | 4/2002 | Raab |
| 6,367,330 B1 | 4/2002 | Schafer |
| 6,413,212 B1 | 7/2002 | Raab |
| 6,457,363 B1 | 10/2002 | Schafer |
| 6,460,004 B2 | 10/2002 | Greer et al. |
| 6,467,352 B2 | 10/2002 | Schafer |
| 6,481,289 B2 | 11/2002 | Dixon |
| 6,487,896 B1 | 12/2002 | Dall'Aglio |
| 6,526,670 B1 | 3/2003 | Carli |
| 6,535,794 B1 | 3/2003 | Raab |
| 6,546,643 B2 * | 4/2003 | Lotze et al. ............... 33/559 |
| 6,593,587 B2 | 7/2003 | Pease |
| 6,598,306 B2 | 7/2003 | Eaton |
| 6,606,539 B2 | 8/2003 | Raab et al. |
| 6,611,346 B2 | 8/2003 | Granger |
| 6,611,617 B1 | 8/2003 | Crampton |
| 6,612,044 B2 | 9/2003 | Raab et al. |
| 6,618,496 B1 | 9/2003 | Tassakos et al. |
| 6,661,820 B1 | 12/2003 | Camilleri et al. |
| 6,668,466 B1 | 12/2003 | Bieg et al. |
| 6,684,705 B1 | 2/2004 | Schafer |
| 6,717,166 B2 | 4/2004 | Pease |
| 6,759,648 B2 | 7/2004 | Baxter et al. |
| 6,769,307 B1 | 8/2004 | Dixon |
| 6,796,048 B2 | 9/2004 | Steffey et al. |
| 6,817,108 B2 | 11/2004 | Eaton |
| 6,820,346 B2 | 11/2004 | Raab et al. |
| 6,858,857 B2 | 2/2005 | Pease |
| 6,858,858 B2 | 2/2005 | Pease |
| 6,868,359 B2 | 3/2005 | Raab |
| 6,879,933 B2 | 4/2005 | Steffey et al. |
| 6,892,465 B2 | 5/2005 | Raab et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,036 B2 | 8/2005 | Raab et al. |
| 6,944,564 B2 | 9/2005 | De Jonge et al. |
| 6,952,882 B2 | 10/2005 | Raab et al. |
| 6,957,496 B2 | 10/2005 | Raab et al. |
| 6,964,113 B2 | 11/2005 | Bridges et al. |
| 6,973,734 B2 | 12/2005 | Raab et al. |
| 6,984,236 B2 | 1/2006 | Raab |
| 6,988,322 B2 | 1/2006 | Raab et al. |
| 6,996,912 B2 | 2/2006 | Raab et al. |
| 7,003,892 B2 | 2/2006 | Eaton et al. |
| 7,006,084 B1 | 2/2006 | Buss et al. |
| 7,017,275 B2 | 3/2006 | Raab et al. |
| 7,024,032 B2 | 4/2006 | Kidd et al. |
| 7,032,321 B2 | 4/2006 | Raab et al. |
| 7,043,847 B2 | 5/2006 | Raab et al. |
| 7,051,447 B2 * | 5/2006 | Kikuchi et al. ............... 33/503 |
| 7,051,450 B2 | 5/2006 | Raab et al. |
| 7,069,664 B2 | 7/2006 | Raab et al. |
| 7,073,271 B2 | 7/2006 | Raab et al. |
| 7,096,077 B2 | 8/2006 | Price et al. |
| 7,113,878 B1 | 9/2006 | Loferer et al. |
| 7,145,162 B2 | 12/2006 | Cheng et al. |
| 7,152,456 B2 | 12/2006 | Eaton |
| 7,174,651 B2 | 2/2007 | Raab et al. |
| 7,193,690 B2 | 3/2007 | Ossig et al. |
| 7,246,030 B2 | 7/2007 | Raab et al. |
| 7,248,374 B2 | 7/2007 | Bridges |
| 7,268,892 B2 | 9/2007 | Van Den Bossche |
| 7,269,910 B2 | 9/2007 | Raab et al. |
| 7,280,226 B2 | 10/2007 | Van Den Bossche |
| 7,296,364 B2 | 11/2007 | Seitz et al. |
| 7,296,979 B2 | 11/2007 | Raab et al. |
| 7,299,145 B2 | 11/2007 | De Jonge et al. |
| 7,313,264 B2 | 12/2007 | Crampton |
| 7,372,581 B2 | 5/2008 | Raab et al. |
| 7,384,308 B2 | 6/2008 | Boehnlein et al. |
| 7,395,606 B2 | 7/2008 | Crampton |
| 7,428,061 B2 | 9/2008 | Coppenolle et al. |
| 7,430,068 B2 * | 9/2008 | Becker et al. ............... 358/511 |
| 7,431,619 B2 | 10/2008 | Boehnlein et al. |
| 7,441,341 B2 | 10/2008 | Eaton |
| 7,525,276 B2 | 4/2009 | Eaton |
| 7,546,689 B2 | 6/2009 | Ferrari et al. |
| 7,552,543 B2 | 6/2009 | Tomelleri |
| 7,568,293 B2 | 8/2009 | Ferrari |
| 7,576,847 B2 | 8/2009 | Bridges |
| 7,578,069 B2 | 8/2009 | Eaton |
| D599,226 S | 9/2009 | Gerent et al. |
| 7,581,988 B2 | 9/2009 | Boehnlein et al. |
| 7,584,534 B2 | 9/2009 | Pease et al. |
| 7,591,078 B2 | 9/2009 | Crampton |
| 7,604,207 B2 | 10/2009 | Hasloecher et al. |
| 7,614,157 B2 * | 11/2009 | Granger ............... 33/503 |
| 7,624,510 B2 | 12/2009 | Ferrari |
| 7,640,674 B2 | 1/2010 | Ferrari et al. |
| 7,676,945 B2 | 3/2010 | Prestidge et al. |
| 7,693,325 B2 | 4/2010 | Pulla et al. |
| 7,701,559 B2 | 4/2010 | Bridges et al. |
| 7,712,468 B2 | 5/2010 | Hargadon |
| 7,733,544 B2 | 6/2010 | Becker et al. |
| 7,735,234 B2 | 6/2010 | Briggs et al. |
| 7,743,524 B2 | 6/2010 | Eaton et al. |
| 7,758,495 B2 | 7/2010 | Pease et al. |
| 7,765,707 B2 | 8/2010 | Tomelleri |
| 7,774,949 B2 | 8/2010 | Ferrari |
| 7,779,548 B2 | 8/2010 | Ferrari |
| 7,784,194 B2 | 8/2010 | Raab et al. |
| 7,797,849 B2 * | 9/2010 | Gomez et al. ............... 33/503 |
| 7,805,851 B2 * | 10/2010 | Pettersson ............... 33/503 |
| 7,805,854 B2 | 10/2010 | Eaton |
| 7,908,757 B2 * | 3/2011 | Ferrari ............... 33/503 |
| 2002/0087233 A1 | 7/2002 | Raab |
| 2003/0167647 A1 | 9/2003 | Raab et al. |
| 2004/0148791 A1 * | 8/2004 | Eaton ............... 33/503 |
| 2008/0016711 A1 | 1/2008 | Baebler |

| | | |
|---|---|---|
| 2009/0000136 A1 | 1/2009 | Crampton |
| 2009/0010740 A1* | 1/2009 | Ferrari .................... 414/225.01 |
| 2009/0083985 A1 | 4/2009 | Ferrari |
| 2009/0106994 A1 | 4/2009 | Gomez |
| 2009/0205088 A1 | 8/2009 | Crampton et al. |
| 2009/0241360 A1 | 10/2009 | Tait et al. |
| 2010/0095542 A1 | 4/2010 | Ferrari |
| 2010/0325907 A1 | 12/2010 | Tait |
| 2011/0119026 A1 | 5/2011 | Atwell et al. |
| 2011/0170534 A1 | 7/2011 | York |
| 2011/0173825 A1 | 7/2011 | Danielson et al. |
| 2011/0175745 A1 | 7/2011 | Atwell et al. |

FOREIGN PATENT DOCUMENTS

| | | |
|---|---|---|
| DE | 4345091 | 7/1995 |
| DE | 19945189 | 4/2001 |
| DE | 10112977 | 11/2002 |
| DE | 10 2006 018558 | 10/2007 |
| DE | 10 2006/032094 | 1/2008 |
| EP | 0266070 | 5/1988 |
| EP | 0522610 | 1/1993 |
| EP | 0591550 | 4/1994 |
| EP | 2108917 | 10/2009 |
| FR | 2740546 | 4/1997 |
| GB | 2274526 | 7/1994 |
| GB | 2 311 862 | 10/1997 |
| JP | 05-031685 | 2/1993 |
| JP | 2003-021133 | 1/2003 |
| JP | 2003-175484 | 6/2003 |
| WO | WO 90/08939 | 8/1990 |
| WO | WO 93/05479 | 3/1993 |
| WO | WO 98/08050 | 2/1998 |
| WO | WO 2005/100908 | 10/2005 |
| WO | WO 2007/039278 | 4/2007 |
| WO | WO 2008/066896 | 6/2008 |

OTHER PUBLICATIONS

Horie T. et al., Remote force control of robot using PHANToM haptic model and force sensor, Assembly and Task Planning, Proceedings of the IEEE international L. Symposium, May 28, 2001, pp. 128-135, NJ, USA.

* cited by examiner

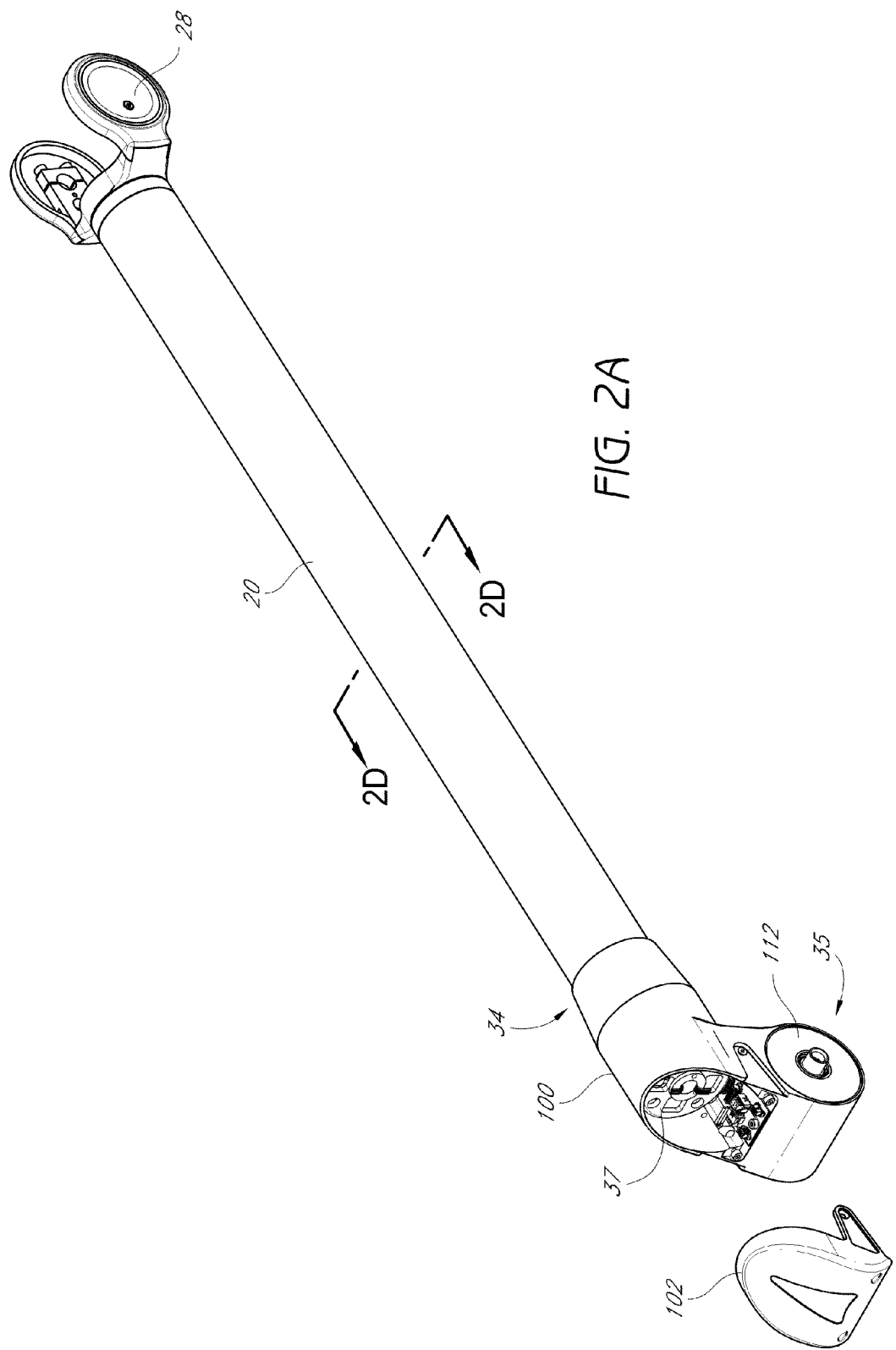

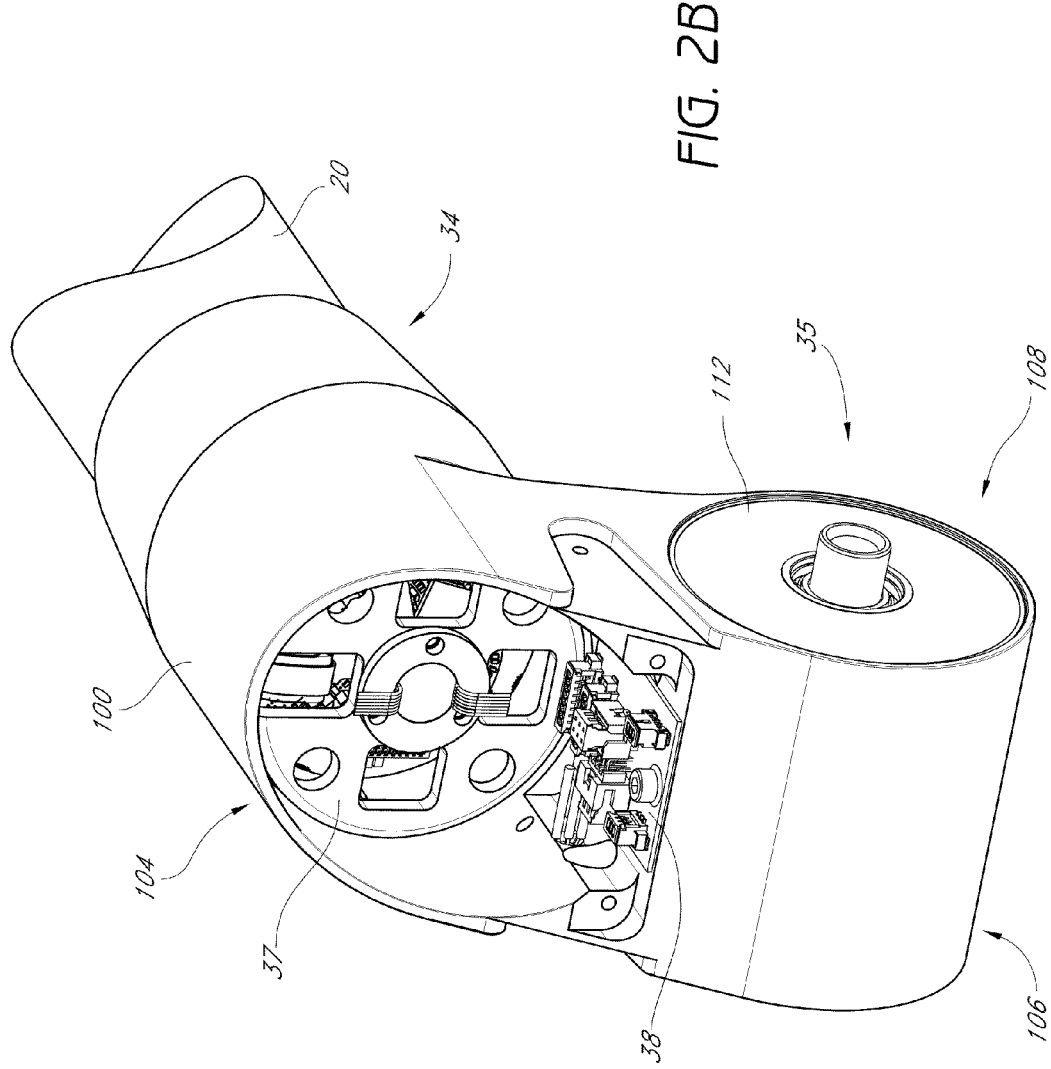

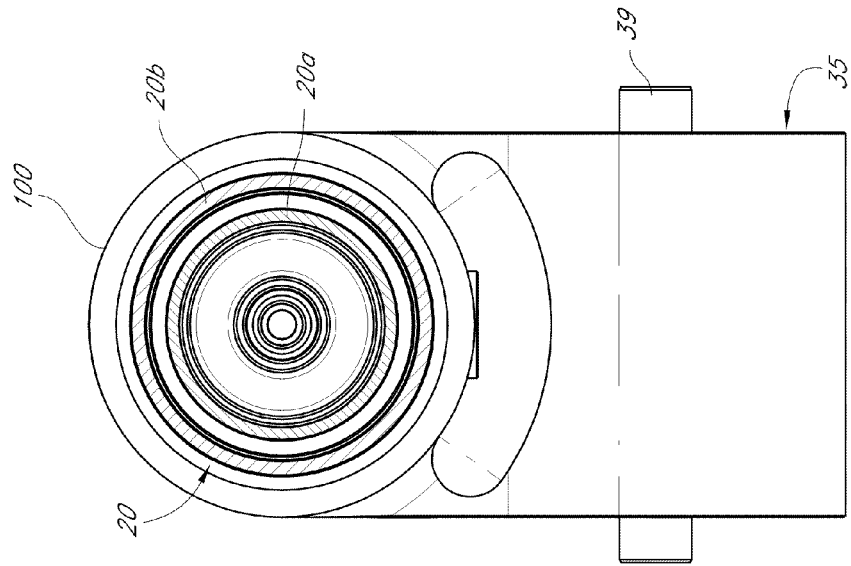
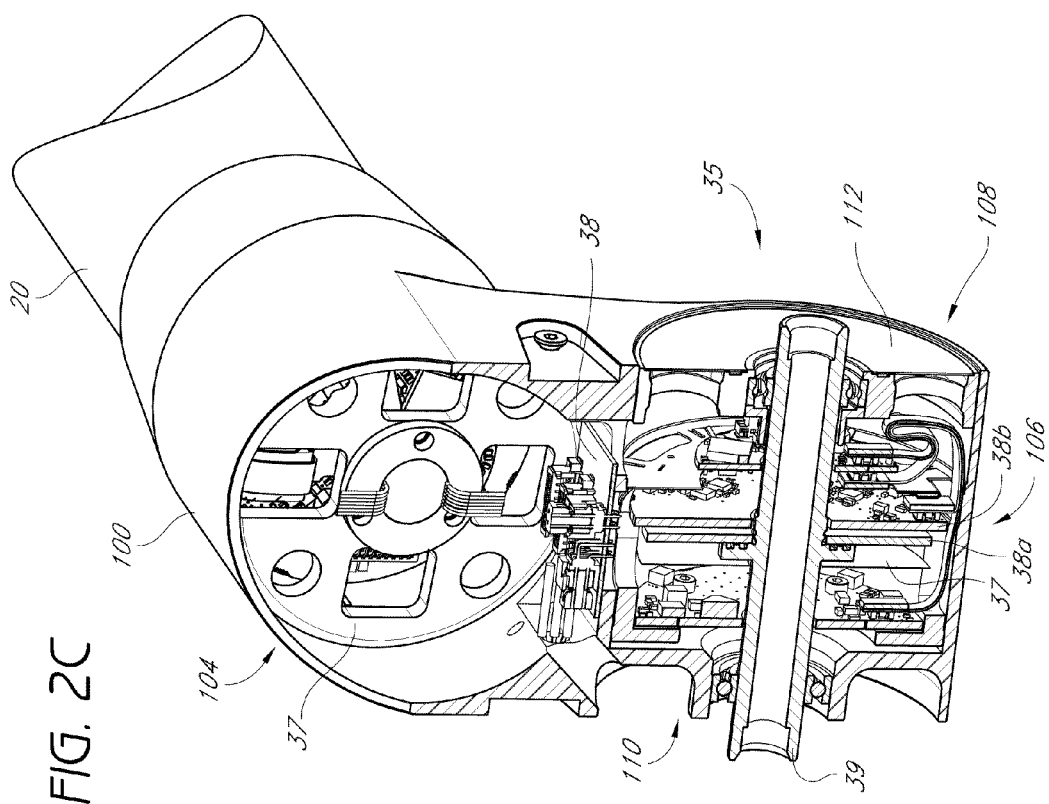

ENHANCED POSITION DETECTION FOR A CMM

CROSS-REFERENCE TO RELATED APPLICATIONS

This application claims the priority benefit under 35 U.S.C. §119(e) to U.S. Provisional Patent Application Ser. No. 61/259,105 (filed Nov. 6, 2009), the entirety of which is hereby expressly incorporated by reference herein.

BACKGROUND OF THE INVENTION

1. Field of the Invention

The present invention relates to articulated arms and coordinate measurement, and more particularly to coordinate measurement machines.

2. Description of the Related Art

Rectilinear measuring systems, also referred to as coordinate measuring machines (CMMs) and articulated arm measuring machines, are used to generate highly accurate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g., U.S. Pat. Nos. 5,829,148 and 7,174,651, which are incorporated herein by reference in their entireties.

Generally, there is a demand for such machines with a high degree of accuracy, high reliability and durability, substantial ease of use, and low cost, among other qualities. The disclosure herein provides improvements of at least some of these qualities.

SUMMARY OF THE INVENTIONS

In one embodiment, a coordinate measurement device comprises an articulated arm and a laser scanner assembly. The articulated arm can have a first end, a second end, and a plurality of jointed arm segments therebetween. Each arm segment can define at least one axis of rotation, and a last axis of rotation can be defined by bearings near a distal end of the arm. The laser scanner assembly can couple to the distal end of the arm. The arm can continuously generate trigger signals that are received by the laser scanner and indicate a time at which the arm's position is measured.

In another embodiment, a method of operating a coordinate measurement device is provided. The position of an articulated arm can be continuously measured, and a plurality of trigger signals can be generated upon each measurement of the arm's position. These trigger signals can be transmitted to a scanner at an end of the articulated arm. The scanner can also acquire a scanner measurement, and that measurement can be associated with a plurality of the trigger signals.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 2A is a perspective view of the transfer member of FIG. 2 with a cover portion removed;

FIG. 2B is an enlarged perspective view of the transfer member of FIG. 2A;

FIG. 2C is an enlarged cross-sectional view of the articulation members of FIG. 2

FIG. 2D is an enlarged cross-sectional view of the transfer member of FIG. 2B;

DETAILED DESCRIPTION OF THE PREFERRED EMBODIMENTS

Figure 1:
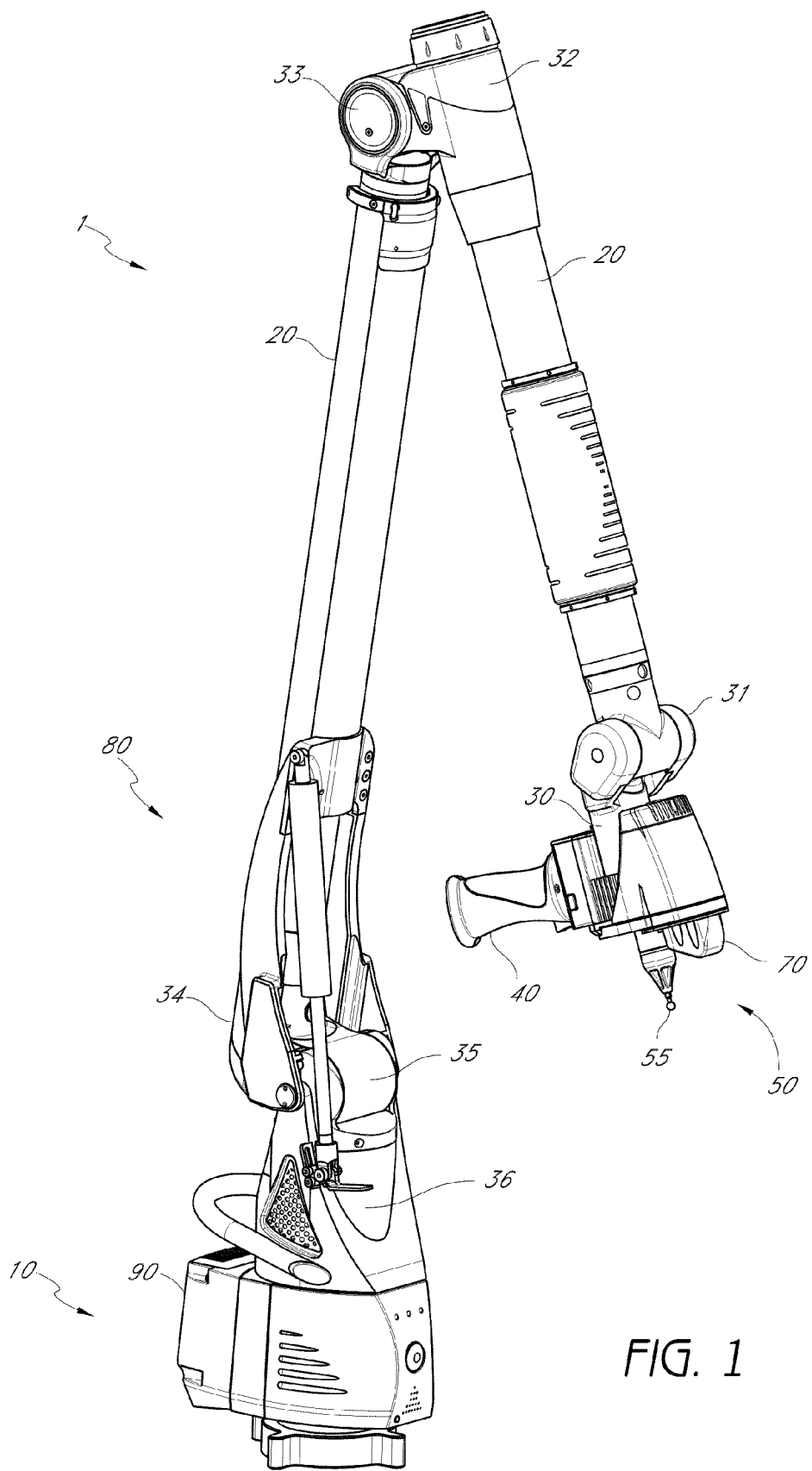
FIG. 1 is a perspective view of an articulated arm.
Figure 1A:
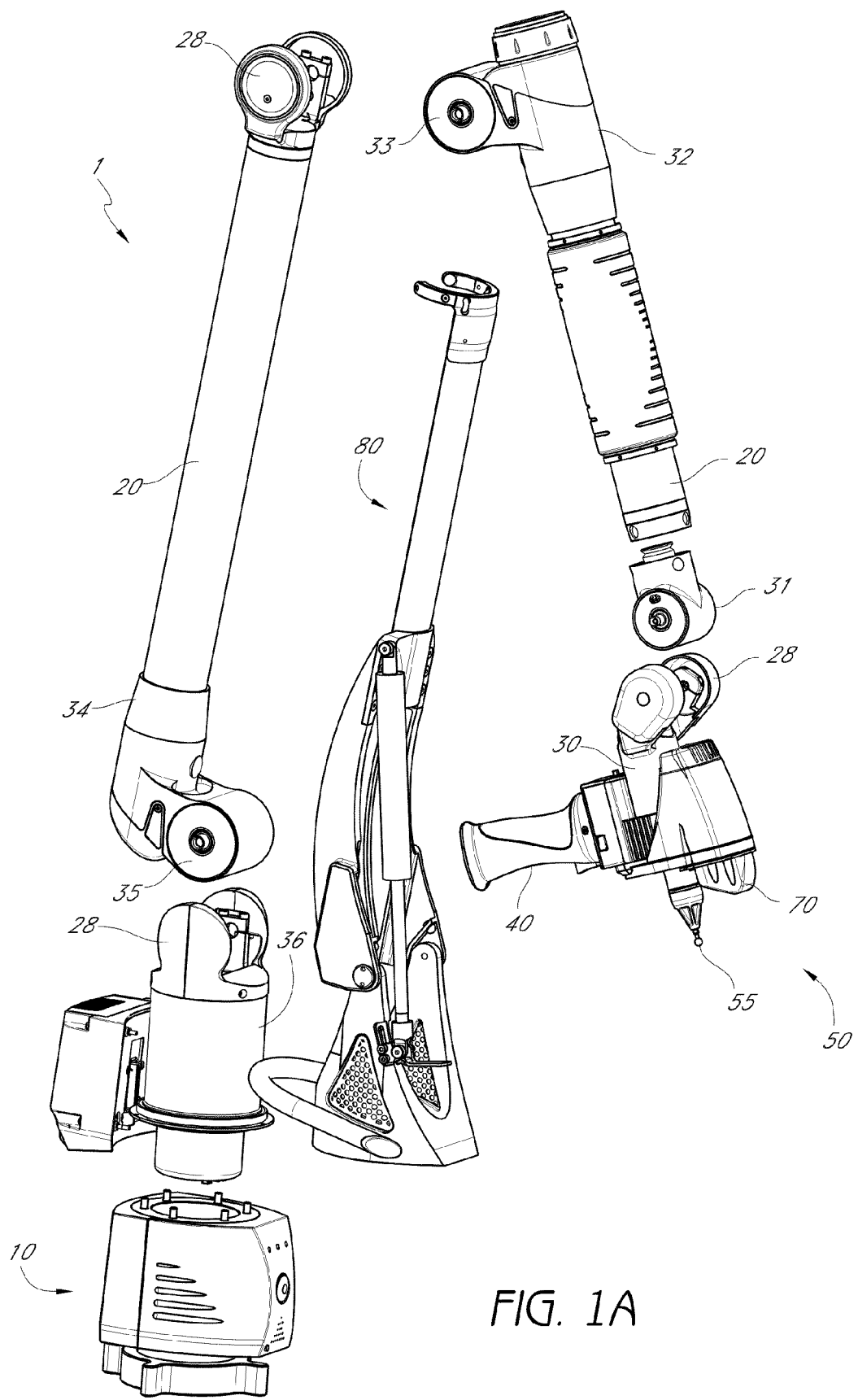
FIG. 1A is an exploded view of the articulated arm of FIG. 1.

FIGS. 1 and 1A illustrate one embodiment of a portable coordinate measuring machine (PCMM) 1 in accordance with the present invention. In the illustrated embodiment, the PCMM 1 comprises a base 10, a plurality of rigid transfer members 20, a coordinate acquisition member 50 and a plurality of articulation members 30-36 that form "joint assemblies" connecting the rigid transfer members 20 to one another. The articulation members 30-36 along with the transfer members 20 and hinges (described below) are configured to impart one or more rotational and/or angular degrees of freedom. Through the various members 30-36, 20, the PCMM 1 can be aligned in various spatial orientations thereby allowing fine positioning and orientating of the coordinate acquisition member 50 in three dimensional space.

The position of the rigid transfer members 20 and the coordinate acquisition member 50 may be adjusted using manual, robotic, semi-robotic and/or any other adjustment method. In one embodiment, the PCMM 1, through the various articulation members 30-36, is provided with seven rotary axes of movement. It will be appreciated, however, that there is no strict limitation to the number of axes of movement that may be used, and fewer or additional axes of movement may be incorporated into the PCMM design.

In the embodiment PCMM 1 illustrated in FIG. 1, the articulation members 30-36 can be divided into two functional groupings based on their associated motion members operation, namely: 1) those articulation members 30, 32, 34, 36 which are associated with the swiveling motion associated with a specific and distinct transfer member (hereinafter, "swiveling joints"), and 2) those articulation members 31, 33, 35 which allow a change in the relative angle formed between two adjacent members or between the coordinate acquisition member 30 and its adjacent member (hereinafter, "hinge joints" or "hinges"). While the illustrated embodiment includes four swiveling joints and three hinge joints positioned as to create seven axes of movement, it is contemplated that in other embodiments, the number of and location of hinge joints and swiveling joints can be varied to achieve different movement characteristics in a PCMM. For example, a substantially similar device with six axes of movement could simply lack the swivel joint 30 between the coordinate acquisition member 50 and the adjacent articulation member 20. In still other embodiments, the swiveling joints and hinge joints can be combined and/or used in different combinations.

As is know in the art (see e.g., U.S. Pat. No. 5,829,148, which is hereby incorporated by reference herein) and depicted in FIG. 2D, the transfer members 20 can comprise a pair of dual concentric tubular structures having an inner tubular shaft 20a rotatably mounted coaxially within an outer tubular sheath 20b through a first bearing mounted proximately to a first end of the member adjacent and a second bearing located at an opposite end of the member and which can be positioned within the dual axis housing 100. The transfer members 20 operate to transfer motion from one end of the transfer member to the other end of the transfer member. The transfer members 20 are, in turn, connected together with articulation members 30-36 to form joint assemblies.

The hinge joint, in turn, is formed, in part, by the combination of a yoke 28 extending from one end of a transfer member (see FIG. 1A), the rotational shaft extending through the articulation members 31, 33, 35 and the articulation members 31, 33, 35 themselves, which rotate about the rotational shaft to form a hinge or hinge joint.

Each hinge or swiveling joint has its own dedicated motion transducer in the form of an encoder 37 which can be seen in FIG. 2C. Advantageously, both the hinge and swiveling joint encoders are positioned at least partially, and more preferably, entirely within the dual axis housing 100 within the respective articulation members 30-36.

In various embodiments, the coordinate acquisition member 50 comprises a contact sensitive member 55 (depicted as a hard probe in FIG. 1) configured to engage the surfaces of a selected object and generate coordinate data on the basis of probe contact. In the illustrated embodiment, the coordinate acquisition member 50 also comprises a non-contact scanning and detection component that does not necessarily require direct contact with the selected object to acquire geometry data. As depicted, the non-contact scanning device comprises a non-contact coordinate detection device (shown as a laser coordinate detection device/laser scanner) that may be used to obtain geometry data without direct object contact.

The non-contact scanning device can include a camera or other optical device 70, which functions in conjunction with a laser not depicted herein. It will be appreciated that various coordinate acquisition member configurations including: a contact-sensitive probe, a non-contact scanning device, a laser-scanning device, a probe that uses a strain gauge for contact detection, a probe that uses a pressure sensor for contact detection, a device that uses an infrared beam for positioning, and a probe configured to be electrostatically-responsive may be used for the purposes of coordinate acquisition. Further, in some embodiments, a coordinate acquisition member 50 can include one, two, three, or more than three coordinate acquisition mechanisms.

Further description of certain embodiments of a coordinate acquisition member that can be used with the embodiments described herein can be found in U.S. patent application Ser. No. 12/487,535, filed 18 Jun. 2009 and entitled ARTICULATING MEASURING ARM WITH LASER SCANNER, now issued as U.S. Pat. No. 7,908,757, which is incorporated by reference herein in its entirety. As depicted in said reference, the coordinate acquisition member can include a modular laser scanner that can attach to the main body of the coordinate acquisition member (which can also include a touch probe). The modular features can allow various other coordinate detection devices to be used with the coordinate acquisition member. Additionally, other coordinate acquisition members can be used, as is generally know by those of skill in the art.

Figure 2:
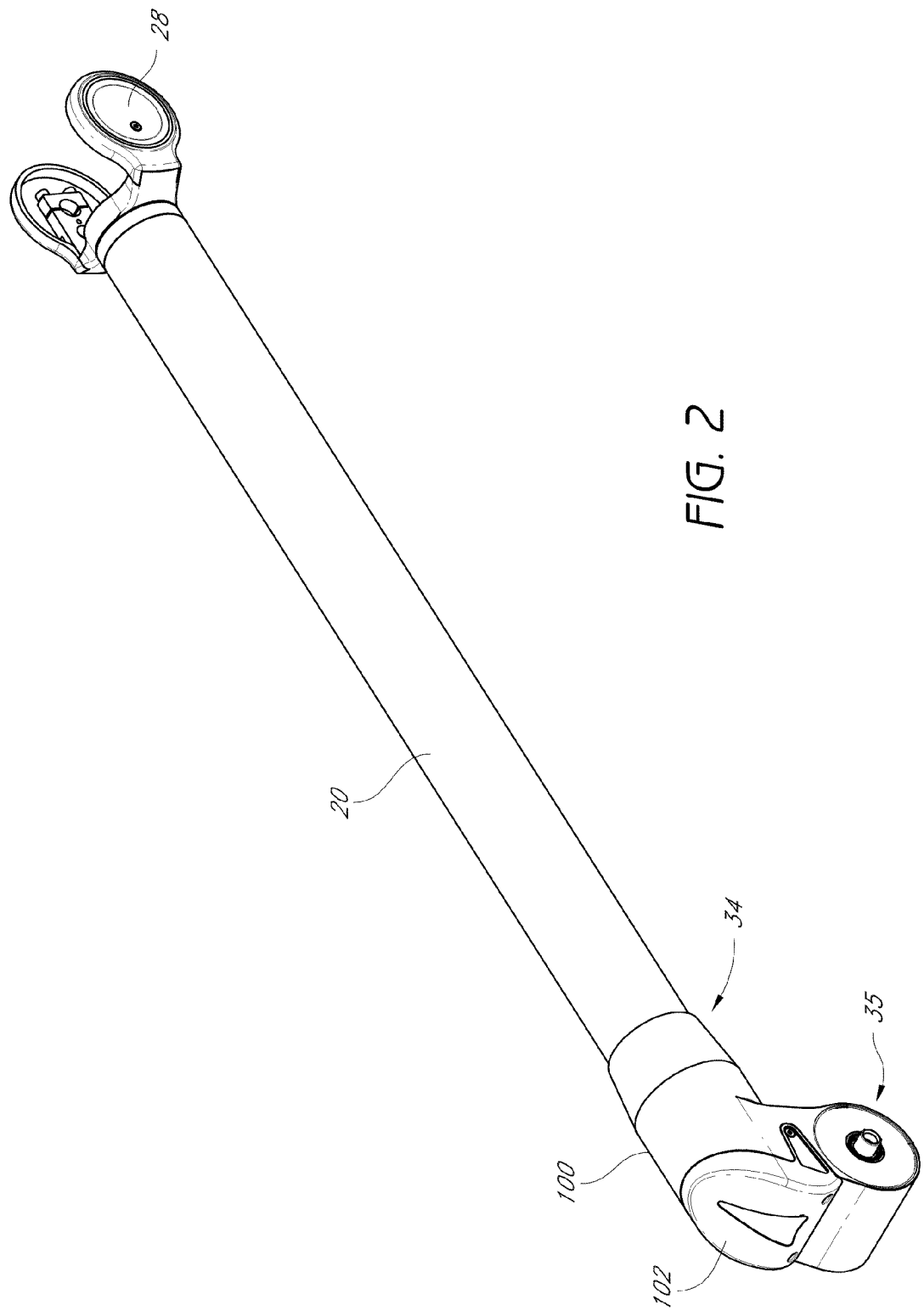
FIG. 2 is a perspective view of a transfer member of the articulated arm of FIG. 1 with its associated articulation members.

Advantageously, as depicted in FIGS. 2-2C, the articulation members 30-36 form a dual-axis housing 100. The dual-axis housing 100 can be a single monoblock housing, a housing comprising multiple pieces bonded together (e.g. by welding, adhesive, etc.), or otherwise. As depicted, the dual-axis housing 100 can be coupled to the transfer members 20 and comprise part of hinge and swivel joints, corresponding to the second and third axes of rotation from the base 10. As noted above, separately functional rotational encoders 37 and associated electronics for measuring a position of the transfer members and hinge and swivel joints (as are generally known by those of skill in the art) can be positioned in the articulation members 34 and 35 (as well as the articulation members 30-33 and 36, depicted in other figures).

To facilitate assembly of the dual-axis assembly, the dual-axis housing 100 can include a removable back cover 102, shown removed in FIG. 2A. As depicted, the removable cover 102 can cover an opening in the housing 100 generally axially aligned with an adjacent transfer member 20 mounted to the housing. Further, in some embodiments the cover 102 can be configured so as not to bare any significant load of the CMM 1. Accordingly, it may be desirable to form the cover 102 of a less rigid material that can also serve as a shock absorber. As depicted, the cover 102 can be positioned at an "elbow" position of the arm 1. During some activities the "elbow" positions may be more likely to abruptly contact an external, hard surface that could damage the arm 1. Advantageously, a cover 102 formed of a shock absorbent material can protect the arm 1 from such damage. Even further, in some embodiments the material of the cover 102 can also serve to promote enhanced sealing with the material of the dual-axis housing 100. The dual-axis housing 100 can comprise a rigid material, and the cover 102 can comprise a more flexible material that can conform to the edges of the housing when mounted thereto, creating an enhanced seal.

Figure 2E:
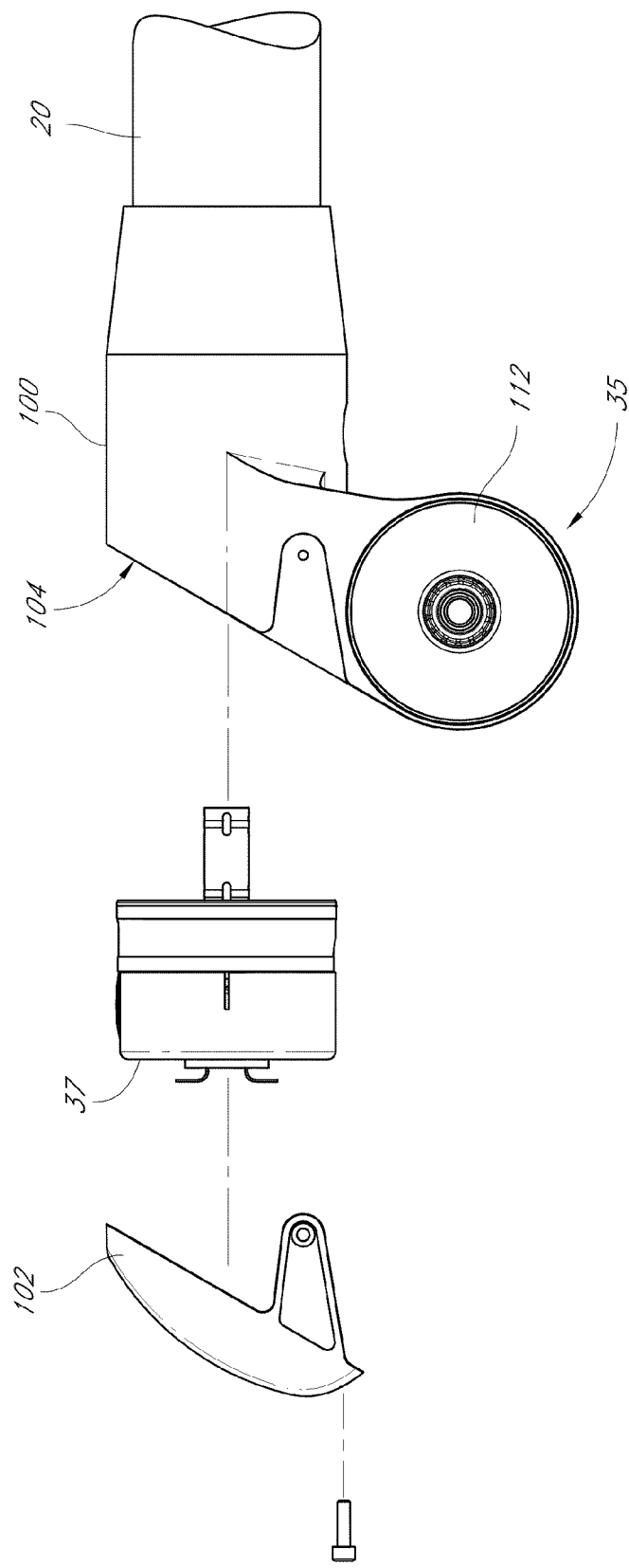
FIG. 2E is a partially exploded side view of the transfer member and articulation members of FIG. 2.

The removable back cover 102 can provide a general sealing of the interior of the dual-axis housing 100 from the external elements, protecting the encoders 37 positioned within the housing. When the cover 102 is removed the separate encoder 37 associated with the articulation member 34 can be exposed and inserted/removed from the dual-axis housing 100 into a swivel-receiving portion 104 generally axially aligned with the depicted transfer member 20 (as depicted in FIG. 2E). In the illustrated embodiment, the encoders associated with the articulation members 34 and 35 are separate components from the transfer members 20. That is, the encoder and transfer member are two separate and distinct components that are connected together but can rotatably operate apart from each other. The same principle can also be applied to the other articulation members 30-33 and 36. That is, the transfer members 20 can operate separately from the articulation members 30-36 that form a joint or joint assembly as described above and operate to measure rotation.

Additionally, additional electronics can be inserted/removed while the cover 102 is removed, as depicted in FIG. 2B. As shown, the dual-axis housing 100 can provide a receiving portion for a printed circuit board 38 that can hold additional electronics. In some embodiments, the additional electronics can perform additional signal processing such as digitizing an analog signal from the encoders. In some embodiments, such digitization can be performed prior to passing the signal to slip rings or other rotatable electronic connections. Further, in some embodiments the additional printed circuit board 38 can facilitate forming the physical electronic connection between both encoders within the dual-axis housing 100.

Further, in the depicted dual-axis housing 100 the separate encoder 37 associated with the articulation member 35 can be inserted/removed independent of the back cover 102. To facilitate this insertion/removal, the dual-axis housing 100 can have a hinge-receiving portion 106 oriented perpendicularly from a primary plane of the housing. The hinge-receiving portion 106 can have an open end 108, into which the encoder 37 can enter, and a substantially closed end 110 against which the encoder can abut to define a position for the encoder. Once the encoder 37 has been inserted, a cap piece 112 can then be inserted to secure the encoder within the hinge-receiving portion 106.

As depicted in FIG. 2C, the encoder 37 can include an encoder disk 38a and a read head 38b. The encoder disk 38a can have a pattern on its surface that can be measured by the read head 38b. For example, in some embodiments the encoder disk 38a can have an optical pattern including varying colors, transparent and opaque portions, or other visible variations; and the read head 38b can include an optical measuring device such as a camera. In some embodiments the disk 38a can have a defined pattern of lines on the disk similar to a bar code such that any image of the disk by the read head can define an absolute rotational angle, as further discussed below. As another example, the encoder disk 38a can have varying magnetic portions and the read head 38b can measure a corresponding magnetic field. The varying patterns on the encoder disk 38a can be measured by the read head 38b to indicate a rotational position, or a change in rotational position of the encoder disk relative to the read head. In turn, as depicted, the read head 38b can be rotationally fixed with the housing 100 and the encoder disk 38a can be rotationally fixed to an encoder shaft 39 that is rotatably mounted within the housing. Thus, rotation of the shaft 39 relative to the housing 100 can cause a corresponding relative rotation between the disk 38a and read head 38b that can be measured. However, it will be clear from the description herein that the apparatus can vary. For example, in some embodiments the read head 38b can be rotatably mounted to the housing 100 and the encoder disk 38a can be rotatably fixed.

In the depicted embodiment, the encoder associated with the articulation member 35 can mount with an adjacent transfer member, not shown in FIG. 2, via a fork joint on the transfer member and the encoder shaft 39. Said fork joint can be similar to that depicted at the end of the depicted transfer member 20 opposite the dual-axis housing 100, with a yoke 28 that can mount to the encoder shaft 39 rotatably mounted within the housing 100. The forks of the yoke 28 can mount about the ends of the dual-axis housing 100 and its contained encoder to form a hinge articulation member 35. Accordingly, both encoders in the dual-axis housing 100 can be inserted/removed independently of one another from the single housing. Notably, in other embodiments the form of the dual-axis housing 100 can vary. For example, in some embodiments the dual-axis housing 100 can form two swivel-receiving portions 104, or two hinge-receiving portions 106, as opposed to one of each.

Placing the encoders 37 into a single housing can provide numerous advantages over prior art assemblies with separate housings. For example, the combined housing can reduce the number of parts and joints required, and thus also reduce cost and assembly time. Further, the accuracy of the device can improve from the elimination of deflection, misalignment, or other problems with multiple components. Additionally, removal of the additional housing can allow a more compact combined joint assembly, allowing the arm to be better supported and have less weight. As shown FIG. 1A, a yoke 28 of the next or proceeding transfer member 20 can be coupled to the bearing shaft extending through dual axis housing 100 to form the hinge joint.

Although depicted as enclosing the second and third axes from the base, a similar dual-axis housing 100 can be used with other combinations of articulation members, such as the fourth and fifth articulation members 32, 33. Further, the dual-axis housing can provide additional advantages not explicitly discussed herein. However, it should be noted that in other embodiments of the inventions described herein, the articulation members 30-36 can each have a separate housing.

It should be appreciated that the dual-axis housing or joint assembly described above can be used in other types of CMMs and need not be used in combination with the additional embodiments described below.

Figure 3:
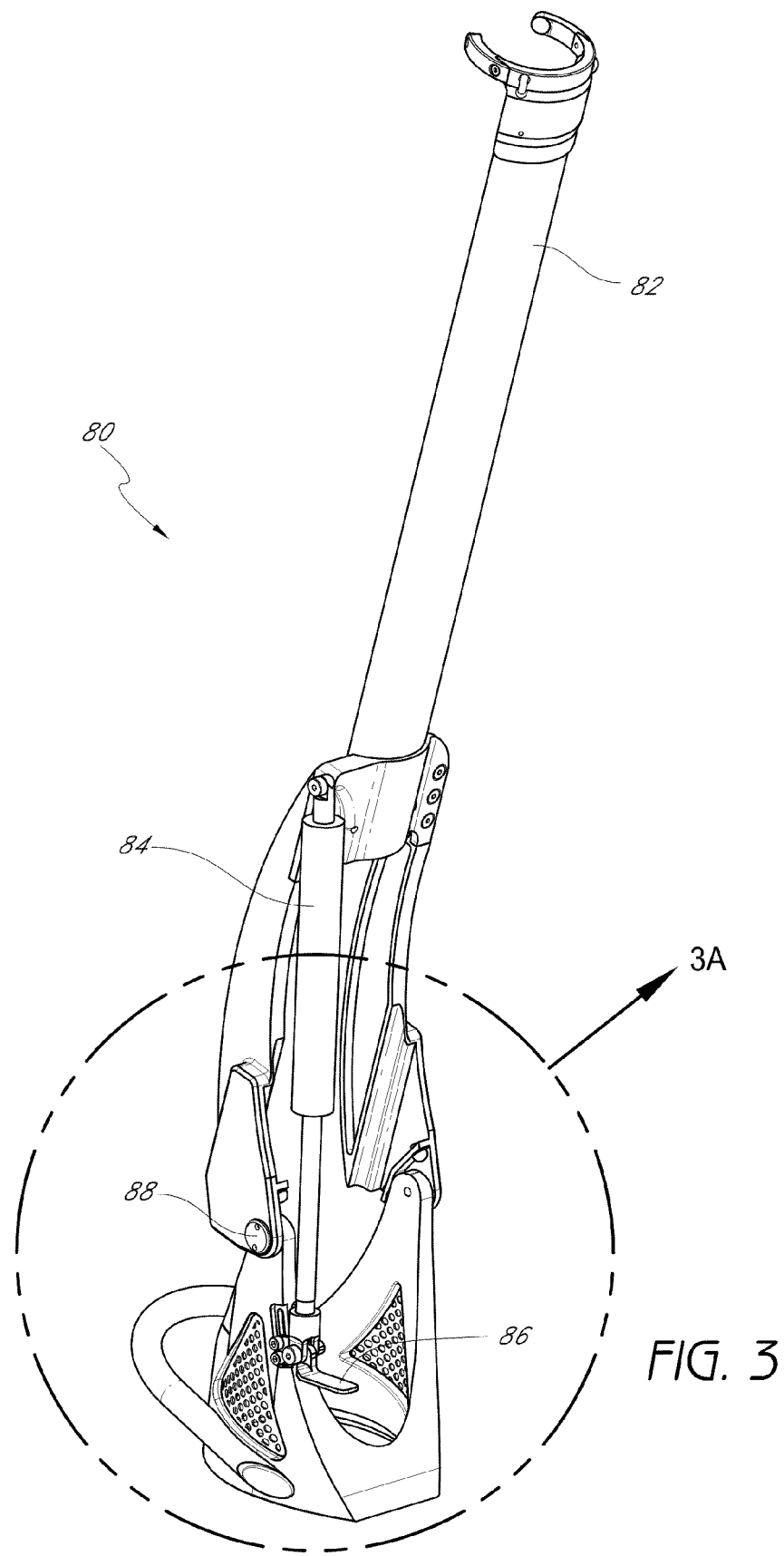
FIG. 3 is a perspective view of a counterbalance system of the articulated arm of FIG. 1.
Figure 3A:
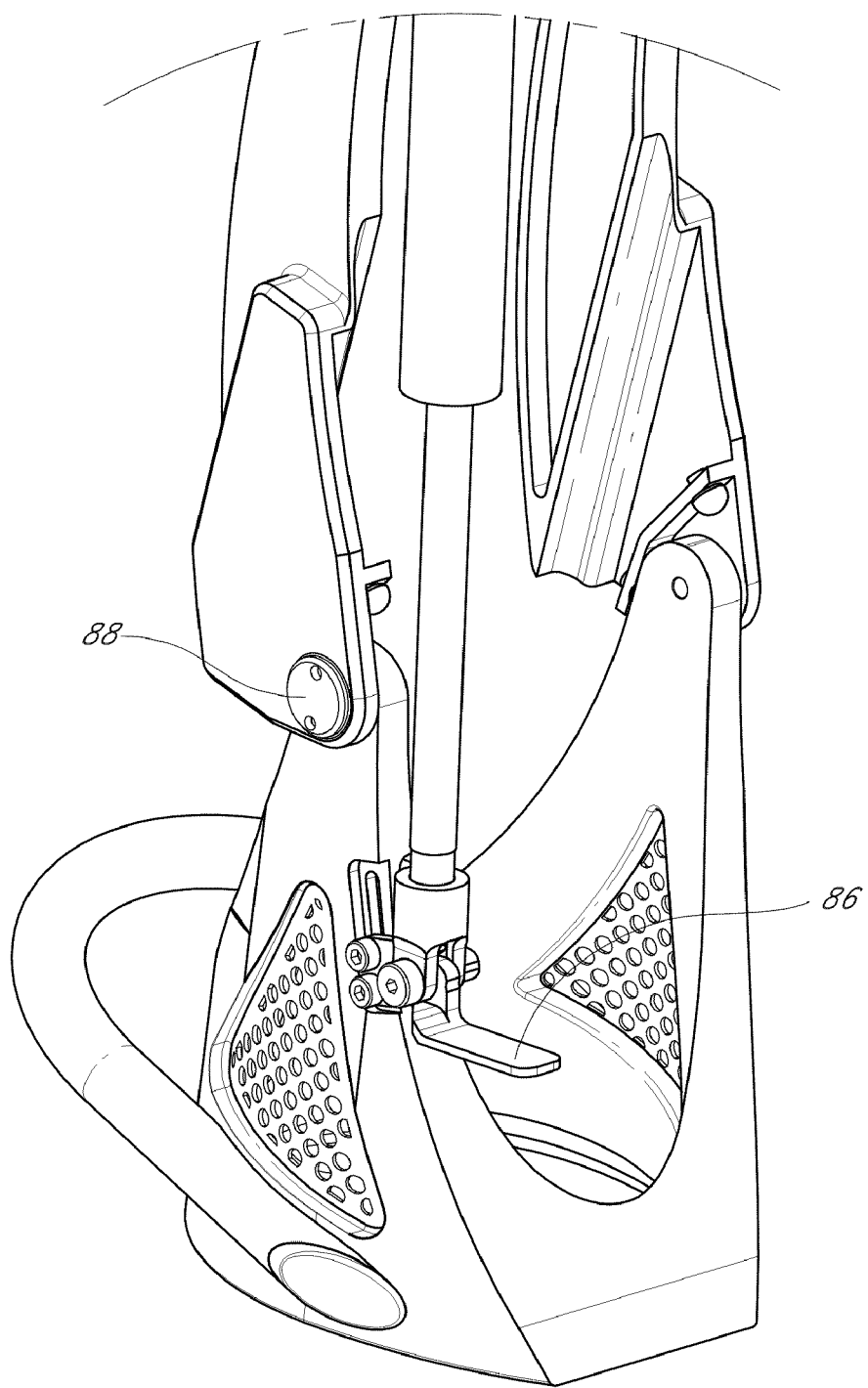
FIG. 3A is an exploded view of the counterbalance system of FIG. 3.
Figure 3B:
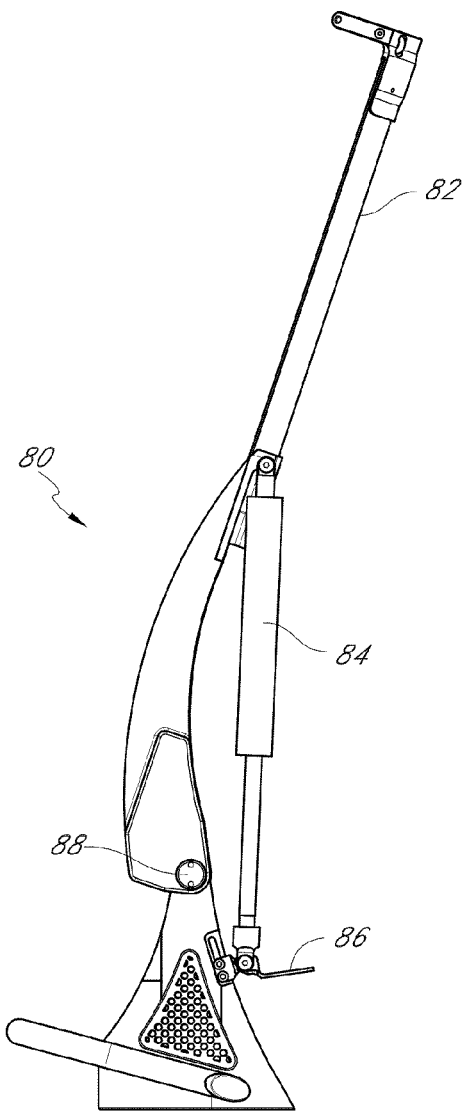
FIG. 3B is a side view of the counterbalance system of FIG. 3 in a first position.
Figure 3C:
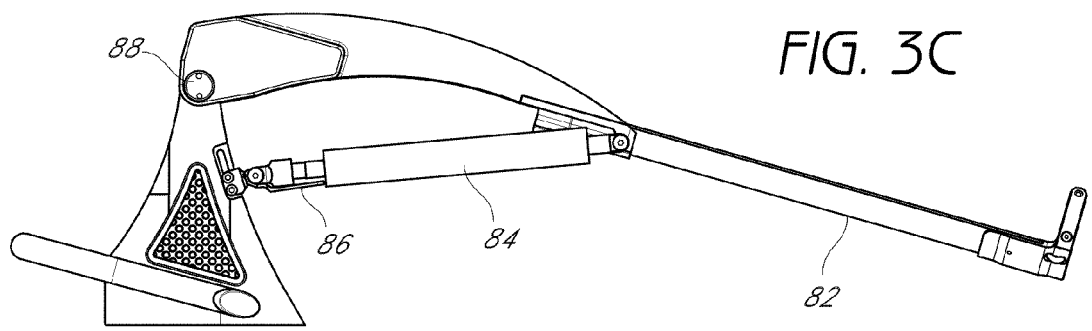
FIG. 3C is a side view of the counterbalance system of FIG. 3 in a second position.

FIGS. 3 and 3A depict an improved counterbalance system 80. As depicted, the counter balance system 80 can include a piston assembly 84 forming a gas shock counterbalance. A nitrogen charged gas spring can connect between points separated by a pivot 88 aligned with an articulation member such as the second-closest-to-the-base articulation member 35. As depicted, the connection point nearer the base 10 can be closer to the pivot 88 than to the base. This results in a counterbalance design where the gas shock is in a predominantly horizontal position when the second linkage is in a horizontal position, as depicted in FIG. 3C. The predominantly horizontal position of the gas shock can be further promoted by the position of the connection point further from the base. As depicted, the connection point further from the base can be positioned at approximately the mid-point of the transfer member 20 supported by the counterbalance system 80. Further, as depicted the piston assembly 84 can include a lock 86 that can increase the resistance against movement of the piston, thus preventing additional rotation of the aligned articulation member 35. In one embodiment the lock is implemented with a lever on the lock 86, pushing on a pin that opens and closes an aperture within the gas shock. The opening and closing of the aperture either allows or prevents the flow of gas within the piston.

This improved counterbalance system 80 can provide a number of advantages. For example, this design can allow the first axis of rotation from the base (associated with articulation member 36) to be shorter, reducing associated deflection. Additionally, this reduced length can be accomplished without a reduced angular span of rotation about the pivot 88. The improved counterbalance system 80 can also reduce the number of parts required, as the locking mechanism and the counterbalance mechanism can be integrally combined into a single system. Further, the piston assembly 84 can damp the motion about the pivot 88. This reduces the chance of damaging the CMM when a user tries to move the arm while it is still locked. However, it should be noted that in other embodiments of the inventions described herein, a different counterbalance system can be used, such as a weight provided on a back end of a transfer member 20. Further, in other embodiments of the inventions described herein, a different locking mechanism can be used, such as a rigid physical stop. It should be appreciated the improved counterbalance system 80 described above can be used in other types of CMMs and need not be used in combination with the additional embodiments described above and below the preceding section.

Figure 4:
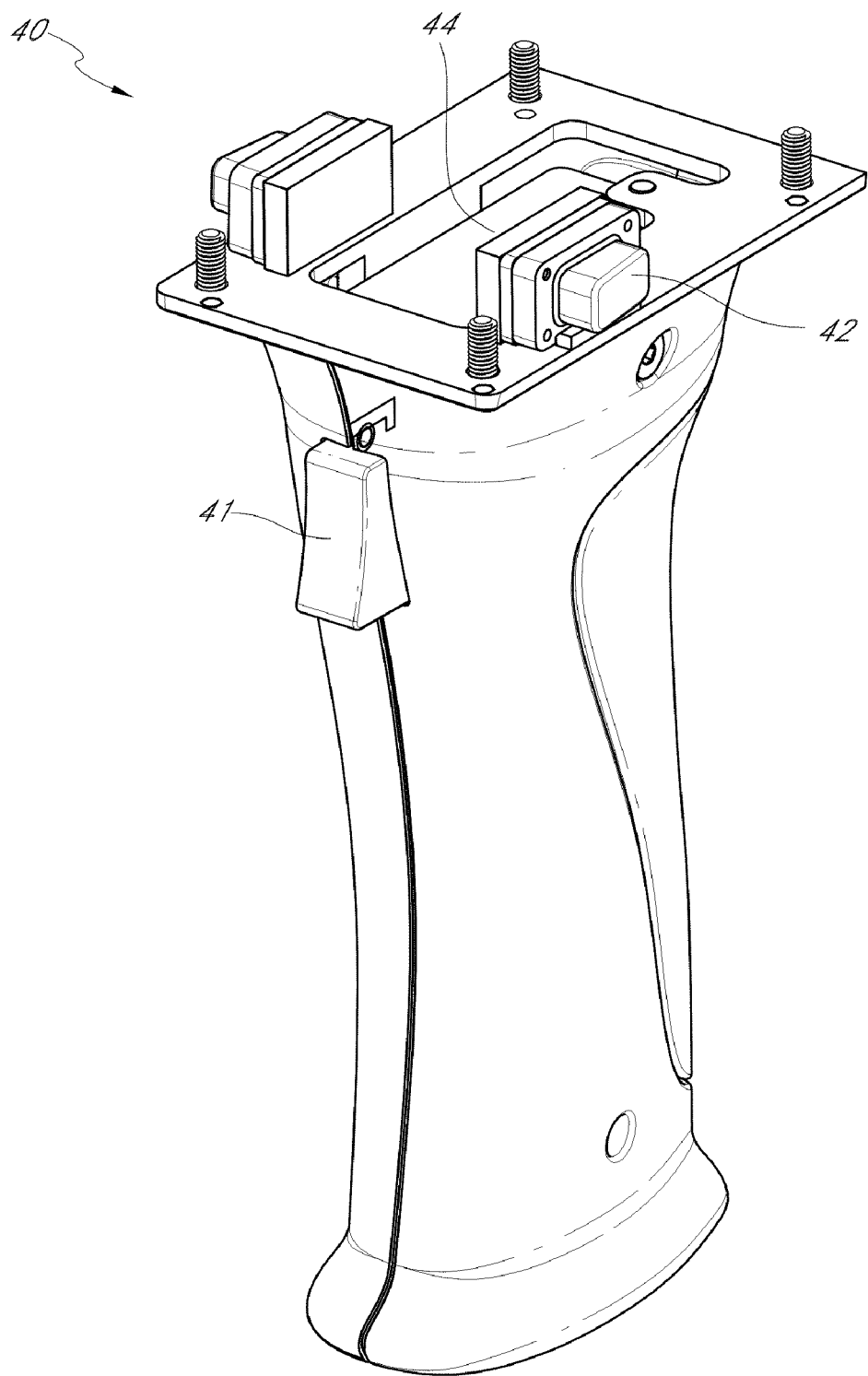
FIG. 4 is a perspective view of a handle of the articulated arm of FIG. 1.

FIG. 4 depicts an improved handle 40. The handle 40 can include one or more integrated buttons 41. The handle can connect to the axis with bolts, snaps, or clamps. Additionally, the handle 40 can include electronics 44 included within its interior. Advantageously, providing the electronics 44 in the handle 40 can further separate the electronics from rotational encoders and other components that may lose accuracy when heated. In some embodiments the handle 40, or the electronics 44 therein, can be thermally isolated from the remainder of the arm. Additionally, when the handle 40 is removable and includes the electronics 44, it can form a modular component similar to the feature packs (described below). Thus, a user can change the functionality by changing the handle 40, and accordingly also changing the electronics 44 and the buttons 41 that control the electronics. A plurality of handles 40 with different functionalities can thus be provided in a CMM system to provide modular features to the CMM. Again, it should be noted that in other embodiments of the inventions described herein, a different handle can be used, or alternatively there can be no distinct handle. Additionally, the handle can contain a battery to power the arm, the scanner or both.

Figure 8:
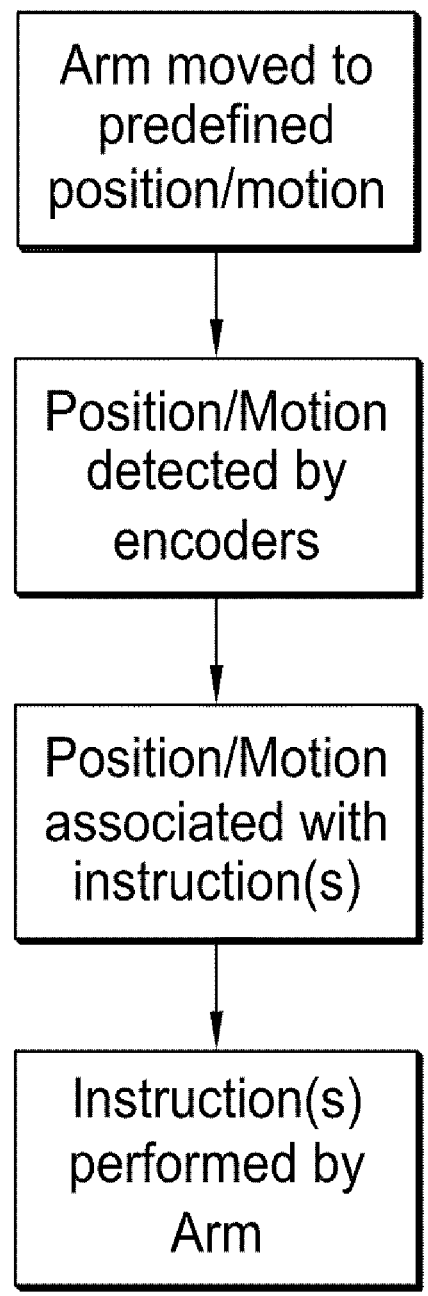
FIG. 8 is a flow diagram of a method of operating an articulated arm.

It should be appreciated the improved handle 40 described above can be used in other types of CMMs and need not be used in combination with the additional embodiments described above and below the preceding section Additionally or alternatively, in some embodiments a CMM arm 1 can be at least partially controlled by motion of the arm itself, as depicted in FIG. 8. For example, whereas some commands or instructions may be triggered by the pressing of a button, pulling a lever, turning a dial, or actuating some other traditional actuation device in some embodiments, in other embodiments the same or different instruction can be triggered by a specific motion or position of the CMM arm 1, which can be detected by the encoders 37. As a more specific example, in some embodiments the CMM arm 1 can be instructed to enter a sleep mode when the arm is placed in a generally folded or retracted position, such as that depicted in FIG. 1. The CMM arm 1 can then perform that instruction. Similarly, the CMM arm 1 can be reawakened by a rapid movement, or movement into a more extended position. Other combinations of instructions, motions, and positions are possible.

For example, in some embodiments the CMM arm 1 can enter into different data acquisition modes depending on its general orientation. Varying the data acquisition mode by position can be advantageous where the CMM arm 1 regularly measures products that require different data acquisition modes along different parts of a product.

Further, in some embodiments the arm can enter into different data acquisition modes depending on its speed of movement. For example, an operator of the CMM may move the CMM slowly when a critical point will soon be measured. Thus, the CMM can increase its measurement frequency, accuracy, or other characteristics when the arm is moving slowly. Additionally, the CMM can be toggled between a mode where the arm is used as a computer mouse and a measurement mode with a quick movement of one of the last axes (embodiments of an associated computer further described below).

As with the previous embodiments, it should be appreciated that these features related to control of the arm can be used in other types of CMMs and need not be used in combination with the additional embodiments described above and below the preceding section.

Figure 5:
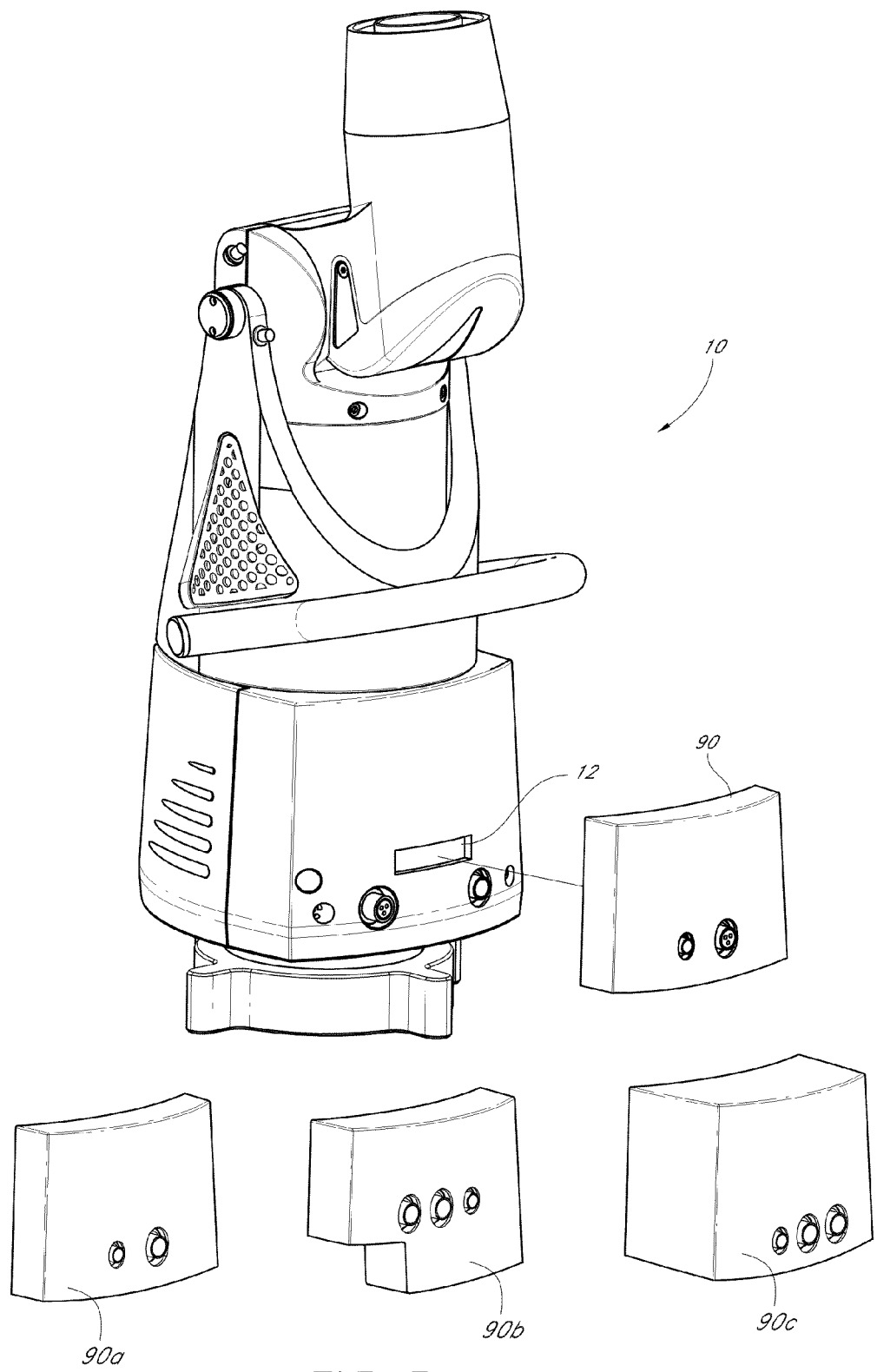
FIG. 5 is a perspective view of a base and a feature pack of the articulated arm of FIG. 1.

FIG. 5 depicts a set of feature packs 90 that can connect with the base 10 via a docking portion 12. The docking portion 12 can form an electronic connection between the CMM arm 1 and the feature pack 90. In some embodiments the docking portion 12 can provide connectivity for high-speed data transfer, power transmission, mechanical support, and the like. Thus, when connected to a docking portion, a feature pack 90 can provide a modular electronic, mechanical, or thermal component to the CMM arm 1, allowing a variety of different features and functionality such as increased battery life, wireless capability, data storage, improved data processing, processing of scanner data signals, temperature control, mechanical support or ballast, or other features. In some embodiments this modular functionality can complement or replace some modular features of the handle 40. The modular feature packs can contain connectors for enhanced functionality, batteries, electronic circuit boards, switches, buttons, lights, wireless or wired communication electronics, speakers, microphones, or any other type of extended functionality that might not be included on a base level product. Further, in some embodiments the feature packs 90 can be positioned at different portions of the CMM arm 1, such as along a transfer member, an articulation member, or as an add-on to the handle 40.

As one example, a feature pack 90 can include a battery, such as a primary battery or an auxiliary battery. Advantageously, in embodiments where the pack 90 is an auxiliary battery the CMM can include an internal, primary battery that can sustain operation of the CMM while the auxiliary battery is absent or being replaced. Thus, by circulating auxiliary batteries a CMM can be sustained indefinitely with no direct power connection.

As another example, a feature pack 90 can include a data storage device. The available data storage on the feature pack 90 can be arbitrarily large, such that the CMM can measure and retain a large amount of data without requiring a connection to a larger and/or less convenient data storage device such as a desktop computer. Further, in some embodiments the data storage device can transfer data to the arm, including instructions for arm operation such as a path of movement for a motorized arm, new commands for the arm upon pressing of particular buttons or upon particular motions or positions of the arm, or other customizable settings.

In examples where the feature pack includes wireless capability, similar functionality can be provided as with a data storage device. With wireless capability, data can be transferred between the CMM and an external device, such as a desktop computer, continuously without a wired connection.

In some embodiments, the CMM can continuously receive commands from the auxiliary device. Further, in some embodiments the auxiliary device can continuously display data from the arm, such as the arm's position or data points that have been acquired. In some embodiments the device can be a personal computer ("PC") and the feature pack can transmit arm coordinate data and scanner data wirelessly to the PC. Said feature pack can combine the arm data and scanner data in the feature pack before wireless transmission or transmit them as separate data streams.

In further embodiments, the feature packs can also include data processing devices. These can advantageously perform various operations that can improve the operation of the arm, data storage, or other functionalities. For example, in some embodiments commands to the arm based on arm position can be processed through the feature pack. In additional embodiments, the feature pack can compress data from the arm prior to storage or transmission.

In another example, the feature pack can also provide mechanical support to the CMM. For example, the feature pack can connect to the base 10 and have a substantial weight, thus stabilizing the CMM. In other embodiments, the feature pack may provide for a mechanical connection between the CMM and a support on which the CMM is mounted.

In yet another example, the feature pack can include thermal functionality. For example, the feature pack can include a heat sink, cooling fans, or the like. A connection between the docking portion and the feature pack can also connect by thermally conductive members to electronics in the base 10 and the remainder of the CMM, allowing substantial heat transfer between the CMM arm and the feature pack.

Further, as depicted in FIG. 1, in some embodiments the feature packs 90 can have a size and shape substantially matching a side of the base 10 to which they connect.

Thus, the feature pack 90 can be used without substantially increasing the size of the CMM, reducing its possible portability, or limiting its location relative to other devices.

Again, the feature packs 90 can be used in combination with each other and the other features described herein and/or can be used independently in other types of CMMs.

Figure 6:
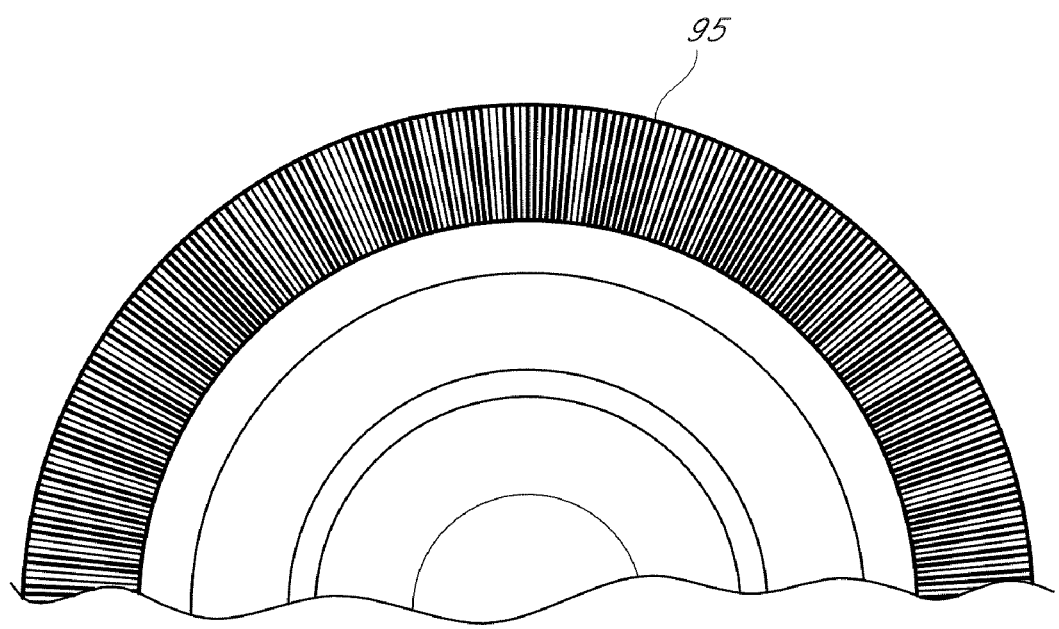
FIG. 6 is a plan view of a demonstrative embodiment of an encoder.

Additionally, in some embodiments the CMM arm 1 can include an absolute encoder disk 95, a demonstrative embodiment depicted in FIG. 6. The absolute encoder disk 95 can include a generally circular, serialized pattern that can be embodied in reflective and non-reflective materials, translucent and non-translucent materials, alternating magnetic properties, or the like. The serialized pattern can allow a read head to determine a unique position on the encoder by only reading a limited portion of the encoder's coded surface. In some embodiments, the serialized pattern can resemble a bar code, as depicted in FIG. 6. The pattern can be non-repetitive along a viewing range of an associated read-head. Thus, an image or other data collected by the read-head from the encoder disk 95 can yield a pattern unique from any other position on the encoder, and therefore be associated with a unique angular position. Each encoder can consist of a single serialized disk that is read by one or more read-heads that can be, e.g., CCD imagers. The use of two or preferably four CCD imagers can improve the accuracy of the encoder by measuring the eccentricity of the axis and subtracting out the eccentricity from the angle measurement. Further, the angle accuracy can be improved by averaging the measurements of the multiple CCD imagers.

In prior art encoders an incremental and repetitive surface was often used, in which the coded surface only indicates incremental steps and not an absolute position. Thus, incremental encoders would require a return to a uniquely identified home position to re-index and determine the incremental positions away from the home position. Advantageously, some embodiments of an absolute encoder disk 95 can eliminate the required return to a home position. This feature of a CMM can also be used in combination with the other features described herein and/or can be used independently in other types of CMMs.

Advantageously, the absolute encoder disk 95 can improve functionality of a CMM arm 1 that enters a sleep mode. Entering sleep mode can reduce the power consumption of a CMM arm 1. However, if enough systems are shut down during sleep mode then incremental encoders may "forget" their position. Thus, upon exiting sleep mode incremental encoders may need to be brought back to the home position prior to use. Alternatively, incremental encoders can be kept partially powered-on during sleep mode to maintain their incremental position. Advantageously, with an absolute encoder disk 95 the encoders can be completely powered off during sleep mode and instantly output their position when power is returned. In other modes, the absolute encoder can read its position at a lower frequency without concern that it may miss an incremental movement and thus lose track of its incremental position. Thus, the CMM arm 1 can be powered-on or awakened and can immediately begin data acquisition, from any starting position, without requiring an intermediary resetting to the "home" position. In some embodiments absolute encoders can be used with every measured axis of rotation of the CMM. This feature of a CMM can also be used in combination with the other features described herein and/or can be used independently in other types of CMMs. For example, as described above, this sleep mode can be induced by movement into a particular position. As a further example, the encoder disk 38*a* can be an absolute encoder disk 95.

Figure 7:
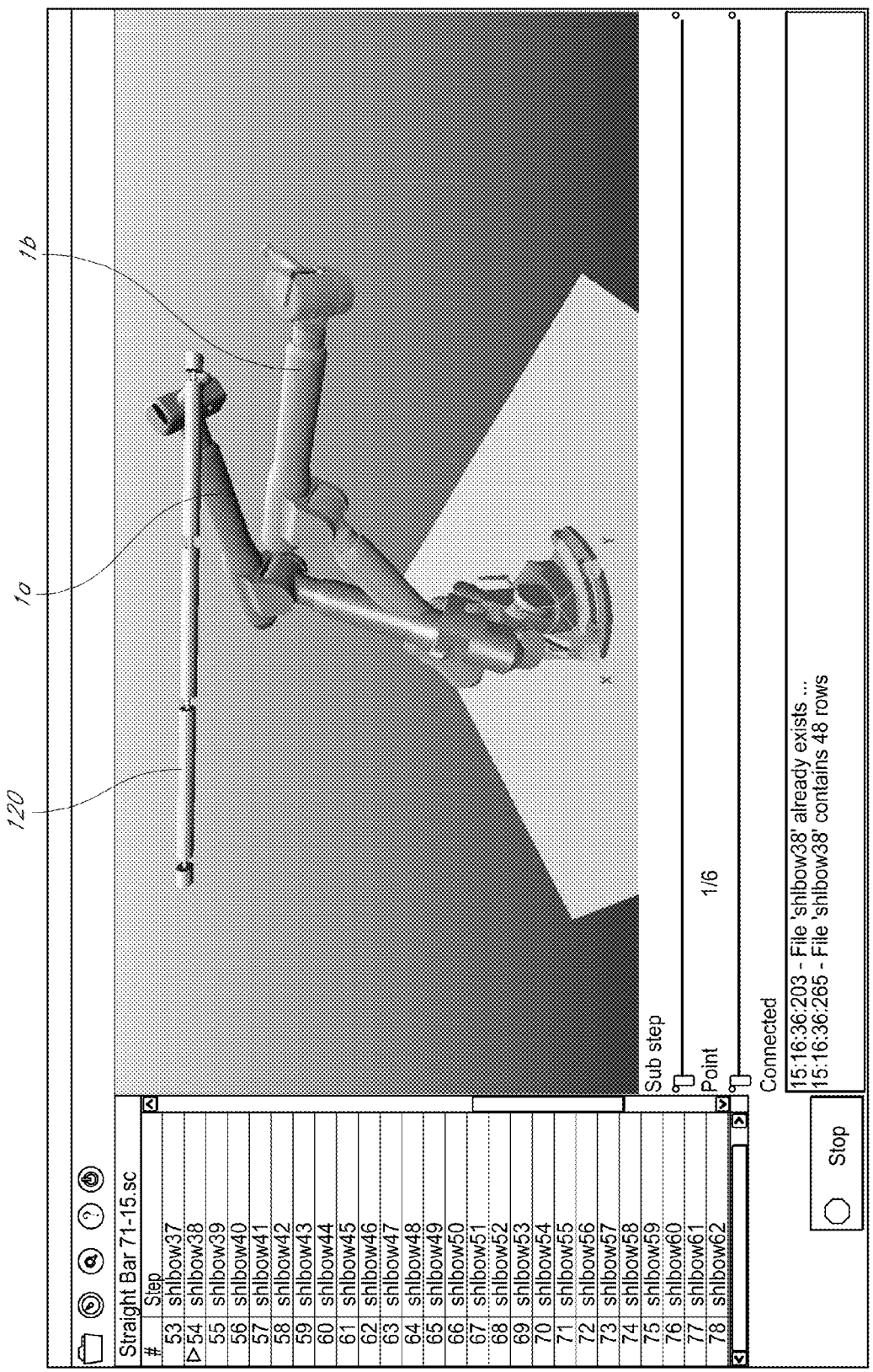
FIG. 7 is a screen shot from an embodiment of calibration software associated with an articulated arm.

Additionally, in some embodiments the CMM arm 1 can be associated with calibration software. Generally, calibration of a CMM arm can be performed by positioning the distal end of the CMM arm (e.g. the probe) at certain predefined and known positions, and then measuring the angular position of the arm. However, these calibration points often do not define a unique arm orientation, but instead can be reached with a plurality of arm positions. To improve the effectiveness of the calibration procedure, software can be included that indicates a preferred or desired CMM arm calibration position 1*a*, including the distal point as well as the orientation of the rest of the arm. Further, in some embodiments the software can also show the arm's current position 1*b* in real time as compared to the desired position 1*a*, as depicted in FIG. 7. Even further, in some embodiments the software can highlight portions of the arm that are out of alignment with the desired position 1*a*.

Figure 7A:
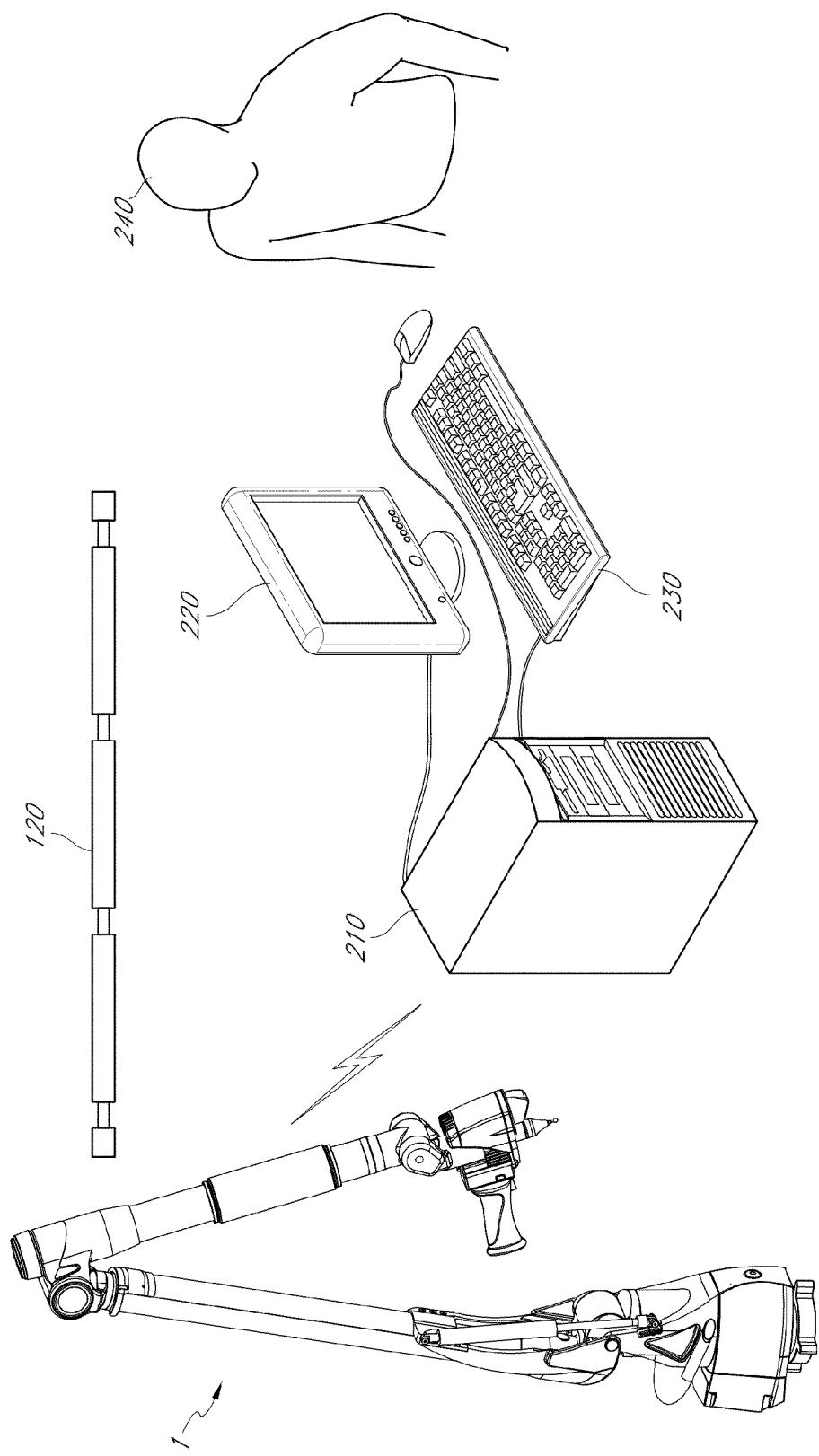
FIG. 7A is a perspective view of an articulated arm in wireless communication with a computer.

As depicted in FIG. 7A, the calibration software can be included on a separate, auxiliary device such as a computer 210 coupled to a display 220 and one or more input devices 230. An operator 240 may plan a calibration procedure using system the computer 210 by manipulating the one or more input devices 230, which may be a keyboard and/or a mouse. The display 220 may include one or more display regions or portions, each of which displays a different view of the CMM arm 1 in its current position, and optionally a desired calibration position (as described above). Each of these displays may be linked internally within a program and data on computer 210. For example, a program running on a computer 210 may have a single internal representation of the CMM arm's current position in memory and the internal representation may be displayed in two or more abstract or semi-realistic manners on display 220.

In various embodiments, the computer 210 may include one or more processors, one or more memories, and one or more communication mechanisms. In some embodiments, more than one computer may be used to execute the modules, methods, and processes discussed herein. Additionally, the modules and processes herein may each run on one or multiple processors, on one or more computers; or the modules herein may run on dedicated hardware. The input devices 230 may include one or more keyboards (one-handed or two-handed), mice, touch screens, voice commands and associated hardware, gesture recognition, or any other means of providing communication between the operator 240 and the computer 210. The display 220 may be a 2D or 3D display and may be based on any technology, such as LCD, CRT, plasma, projection, et cetera.

The communication among the various components of system 200 may be accomplished via any appropriate coupling, including USB, VGA cables, coaxial cables, FireWire, serial cables, parallel cables, SCSI cables, IDE cables, SATA cables, wireless based on 802.11 or Bluetooth, or any other wired or wireless connection(s). One or more of the components in system 200 may also be combined into a single unit or module. In some embodiments, all of the electronic components of system 200 are included in a single physical unit or module.

The enhanced capabilities of the calibration software can allow the operator to refer simply to the live images on the display and position the live image over the desired image which reduces the need for manuals or additional training documentation which slows down the calibration process. Additionally, new calibration technicians can be trained accurately and quickly with the aid of the aforementioned display. The data acquired from these methods of calibration can be more repeatable and more accurate due to, e.g., increased consistency of articulations. In addition to positioning of the CMM in the correct pose, the calibration artifact 120 should be positioned in the correct location within the arm's volume of reach. When the display shows a true 3 dimensional image, the position of the calibration artifact in 3D space can also be correctly displayed, further ensuring that the correct volume of measurement is measured.

These calibration features of a CMM can also be used in combination with the other features described herein and/or can be used independently in other types of CMMs. For example, in some embodiments the calibration process can utilize commands based on the position and motion of the CMM (as discussed above). In some embodiments, during calibration holding the arm still for an extended period of time can indicate to the calibration software that the arm is in the desired position. The software can then acknowledge its processing of this command with a change in display, sound, color, etc. This result can then be confirmed by the operator with a rapid motion of the arm out of said position. The calibration software can then indicate a next calibration point, or indicate that calibration is complete. In addition this functionality can be extended to the operator as well. One example is during the calibration of the probe the software can display the required articulation pose that the CMM should be in as well as the actual pose that it is in. The operator can then move the CMM until it is in the correct position and record a position or it can be recorded automatically. This simplifies the process for the user and improves the accuracy of the data taken. Different methods can be presented depending on the type of probe that is sensed to be present such as laser line scanner, touch trigger probe, etc.

Even further, in some embodiments the CMM arm 1 can include a tilt sensor. In some embodiments the tilt sensor can have an accuracy of at least approximately 1 arc-second. The tilt sensor can be included in the base 10, a feature pack 90, or in other parts of the CMM arm 1. When placed in the base 10 or the feature pack 90, the tilt sensor can detect movement of the CMM arm's support structure, such as a table or tripod on which the arm sits. This data can then be transferred to processing modules elsewhere in the arm or to an external device such as a computer. The CMM arm 1 or the external device can then warn the user of the movement in the base and/or attempt to compensate for the movement, for example when the tilt changes beyond a threshold amount. Warnings to the user can come in a variety of forms, such as sounds, LED lights on the handle 40 or generally near the end of the arm 1, or on a monitor connected to the arm 1. Alternatively or additionally, the warning can be in the form of a flag on the data collected by the arm 1 when tilting has occurred. This data can then be considered less accurate when analyzed later. When attempting to compensate for the movement, in some embodiments the tilting and its effects on position can be partially measured and accounted for in the calibration process. In further embodiments, the tilting can be compensated by adjusting the angular positions of the articulation members accordingly. This feature of a CMM can also be used in combination with the other features described herein and/or can be used independently in other types of CMMs.

In further embodiments, a trigger signal is sent from the arm to the scanner upon each measurement of the arm position. Coincident with the arm trigger the arm can latch the arm position and orientation. The scanner can also record the time of receipt of the signal (e.g. as a time stamp), relative to the stream of scanner images being captured (also, e.g., recorded as a time stamp). This time signal data from the arm can be included with the image data. Dependent on the relative frequency of the two systems (arm and scanner) there may be more than one arm trigger signal per scanner image. It might not be desirable to have the arm running at a lower frequency than the scanner, and this usually results in the arm and scanner frequencies being at least partially non-synchronized. Post-processing of the arm and scanner data can thus combine the arm positions by interpolation with the scanner frames to estimate the arm position at the time of a scanner image. In some embodiments, the interpolation can be a simple, linear interpolation between the two adjacent points. However, in other embodiments higher-order polynomial interpolations can be used to account for accelerations, jerks, etc. This feature of a CMM can also be used in combination with the other features described herein and/or can be used independently in other types of CMMs.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A coordinate measurement device comprising:
   an articulated arm having a first end, a second end, and a plurality of jointed arm segments therebetween, each arm segment defining at least one axis of rotation, a last axis of rotation being defined by bearings near a distal end of the arm; and a laser scanner assembly coupled to the distal end of the arm wherein the arm continuously generates trigger signals which are received by the laser scanner and indicate a time at which the arm's position is measured, wherein an arm measurement frequency is higher than a scanner measurement frequency.

2. The CMM of claim 1 wherein the trigger signal is created by a function generator in electronics in the arm.

3. A coordinate measurement device comprising:

an articulated arm having a first end, a second end, and a plurality of jointed arm segments therebetween, each arm segment defining at least one axis of rotation, a last axis of rotation being defined by bearings near a distal end of the arm; and a laser scanner assembly coupled to the distal end of the arm wherein the arm continuously generates trigger signals which are received by the laser scanner and indicate a time at which the arm's position is measured, wherein the arm position at the time of a scanner image is calculated by interpolating between two arm positions based on times associated with the trigger signals and the time of the scanner image.

4. The CMM of claim 3, wherein the trigger signal is created by a function generator in electronics in the arm.

5. A method of operating a coordinate measurement device comprising:

continuously measuring the position of an articulated arm;

generating a plurality of trigger signals upon each measurement of the position of the articulated arm;

transmitting the trigger signals to a scanner at an end of the articulated arm;

acquiring a scanner measurement from the scanner;

associating the scanner measurement with one or more trigger signals; and associating an interpolated arm position with the scanner measurement.

6. The method of claim 5, wherein the interpolation is a linear interpolation.

7. The method of claim 5, wherein the interpolation is a higher order polynomial interpolation.

8. The method of claim 5, wherein the step of continuously measuring comprises continuously outputting the angular position of a plurality of rotatable joints.

9. The method of claim 5, wherein the scanner is a laser scanner.

10. The method of claim 9, wherein the scanner measurement comprises coordinate measurements.

11. The method of claim 5, wherein the scanner measurement is associated with a plurality of trigger signals.

12. A method of operating a coordinate measurement device comprising:

continuously measuring the position of an articulated arm;

generating a plurality of trigger signals upon each measurement of the position of the articulated arm;

transmitting the trigger signals to a scanner at an end of the articulated arm;

acquiring a scanner measurement from the scanner; and associating the scanner measurement with one or more trigger signals;

wherein a frequency of measurement of the position of the articulated arm is higher than a frequency of measurement of the scanner.

13. The method of claim 12, wherein the step of continuously measuring comprises continuously outputting the angular position of a plurality of rotatable joints.

14. The method of claim 12, wherein the scanner is a laser scanner.

15. The method of claim 14, wherein the scanner measurement comprises coordinate measurements.

16. The method of claim 12, wherein the scanner measurement is associated with a plurality of trigger signals.

* * * * *